United States Patent
Lestrigant et al.

(10) Patent No.: US 10,071,930 B2
(45) Date of Patent: Sep. 11, 2018

(54) SHEET OF GLASS AND DEVICE INCLUDING SAID SHEET OF GLASS

(71) Applicant: SAINT-GOBAIN GLASS FRANCE, Courbevoie (FR)

(72) Inventors: Claire Lestrigant, Paris (FR); René Gy, Bondy (FR); Julien Sellier, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 523 days.

(21) Appl. No.: 14/430,056

(22) PCT Filed: Sep. 20, 2013

(86) PCT No.: PCT/FR2013/052176
§ 371 (c)(1),
(2) Date: Mar. 20, 2015

(87) PCT Pub. No.: WO2014/044985
PCT Pub. Date: Mar. 27, 2014

(65) Prior Publication Data
US 2015/0251947 A1    Sep. 10, 2015

(30) Foreign Application Priority Data
Sep. 21, 2012  (FR) ...................... 12 58866

(51) Int. Cl.
*C03C 3/085* (2006.01)
*G06F 1/16* (2006.01)
*G06F 3/044* (2006.01)

(52) U.S. Cl.
CPC ............ *C03C 3/085* (2013.01); *G06F 1/1643* (2013.01); *G06F 3/044* (2013.01); *C03C 2217/948* (2013.01); *G06F 2203/04103* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 4,413,252 A | * | 11/1983 | Tyler | .......... H03K 17/962 200/275 |
| 2010/0119846 A1 | | 5/2010 | Sawada | |
| 2013/0093312 A1 | * | 4/2013 | Ono | ................ C03C 3/085 313/489 |
| 2013/0153393 A1 | * | 6/2013 | Omote | ................. G06F 3/044 200/600 |

FOREIGN PATENT DOCUMENTS

| | | | | |
|---|---|---|---|---|
| JP | 2004-029723 A | | 1/2004 | |
| JP | 2004-131314 A | | 4/2004 | |
| JP | 2011-141568 A | | 7/2011 | |
| JP | 2011136895 A | * | 7/2011 | |
| WO | WO 2008/050500 A1 | | 5/2008 | |
| WO | WO 2012086596 A1 | * | 6/2012 | ............ G06F 3/044 |

OTHER PUBLICATIONS

International Search Report issued in International Patent Application No. PCT/FR2013/052176, dated Nov. 18, 2013.

* cited by examiner

*Primary Examiner* — David R Sample
(74) *Attorney, Agent, or Firm* — Pillsbury Winthrop Shaw Pittman LLP

(57) ABSTRACT

A non-reinforced glass sheet, the chemical composition of which is of lithium aluminosilicate type, has a thickness of at most 2.0 mm. Furthermore, an electronic device, in particular a pocket or portable electronic device, includes, as protective glass, the non-reinforced glass sheet.

20 Claims, No Drawings

SHEET OF GLASS AND DEVICE INCLUDING SAID SHEET OF GLASS

CROSS-REFERENCE TO RELATED APPLICATIONS

This application is the U.S. National Stage of PCT/FR2013/052176, filed Sep. 20, 2013, which in turn claims priority to French Application No. 1258866, filed Sep. 21, 2012. The contents of all of these applications are incorporated herein by reference in their entirety.

The invention relates to the field of thin glass sheets. It relates more particularly to thin glass sheets capable of withstanding violent impacts.

Thin glass sheets are commonly used as protective glass for various electronic devices, in particular pocket or portable electronic devices, such as for example smartphones, personal digital assistants (sometimes referred to as PDAs), tablets, digital cameras, multimedia players, computers, television or display screens, etc.

The glass sheets used in such devices are capable of being highly stressed from a mechanical point of view: repeated contacts with hard and pointed objects, impacts of projectiles, being dropped, etc.

In order to increase their impact strength, it is customary to create a surface zone under compression and a central zone under tension, by reinforcing processes, in general processes of thermal tempering or of ion exchange (which is sometimes referred to as "chemical tempering"). In the latter case, the surface substitution of an ion of the glass sheet (generally an alkali metal ion such as sodium) by an ion of greater ionic radius (generally an alkali metal ion, such as potassium) makes it possible to create residual compressive stresses at the surface of the glass sheet, down to a certain depth.

In most of the aforementioned applications, it is also important that the glass sheet does not fragment in the event of breaking. The term "fragmentation" is understood to mean the ability of the glass to break up forming a multitude of small fragments (or even particles), capable of being ejected, or, if they remain in place, of greatly reducing the visibility through the sheet. The reinforcement provided by the presence of residual stresses after tempering is accompanied by core tensions which will promote the fragmentation.

An increasing number of devices, in particular Smartphones or tablets, integrate touch-sensitive functions, that make it possible to detect the touch exerted by a user via a finger or a stylus in order to generate software command actions or actions for manipulating elements displayed on the screen. In order to do this, a tactile sensor is generally positioned between the protective glass and the display screen, which tactile sensor is separated from the protective glass by an adhesive and comprises at least one substrate made of glass or made of plastic (for example made of PET). The tactile sensor is for example of "projected capacitive" type using networks of thin conductive layers on one face or the other of at least one of the substrates.

It would be useful, for reasons of cost, weight, and simplification of the technology, to be able to have glass substrates that make it possible to fulfill the functions of the protective glass and of the tactile sensor at the same time.

However, the chemical reinforcement of the glass makes this integration of the two functions in one and the same substrate difficult. The deposition of the conductive layers cannot be carried out prior to the chemical reinforcement since the latter would deteriorate them. Similarly, the cutting and shaping of the protective glasses must be carried out before the chemical reinforcement since reinforced glasses can no longer be cut, at the risk of unacceptably reducing the effects of the reinforcement. Therefore, wishing to integrate the touch-sensitive function into a protective glass would necessitate the deposition of conductive layers on substrates of small size (after cutting), which is not economically viable.

It would be eminently preferable to be able to deposit the conductive layers necessary for the touch-sensitive function on glass sheets of large size (of several meters wide), before cutting and shaping.

The objective of the invention is to overcome these drawbacks by providing glass sheets that can be used both as tactile sensors and as protective glass, and therefore that are capable of maintaining a high-mechanical strength even after having been badly damaged during the use thereof while having a low fragmentability.

For this purpose, one subject of the invention is a non-reinforced glass sheet, the chemical composition of which is of lithium aluminosilicate type, and the thickness of which is at most 2.0 mm.

The term "non-reinforced" is understood to mean that the glass sheet is neither chemically reinforced nor thermally reinforced. Therefore it does not normally have surface stresses of greater than 50 MPa, in particular 10 MPa and even 1 MPa. Not being chemically reinforced, the sheet does not normally contain an overconcentration of an alkali metal oxide, such as an oxide of Na or K, at the surface with respect to the core of the sheet.

The inventors have been able to demonstrate the fact that the glass sheets according to the invention surprisingly exhibited, owing to their chemical composition, a strength after severe damage (for example in the event of impact) that is substantially improved, despite the absence of any mechanical reinforcement. An important consequence for the final product is the absence of fragmentation after rupture. Another consequence, which is important from the point of view of the process and that of the product, lies in the fact that the glass sheet can be used as protective glass and at the same time integrate the touch-sensitive function (by being the support for the tactile sensor), it being possible for the deposition of the conductive layers to be carried out economically on sheets of large size, before cutting and shaping of the edges.

Another subject of the invention is a protective glass for an electronic device obtained from a glass sheet according to the invention. A further subject of the invention is the use of the glass sheet according to the invention as protective glass for an electronic device, in particular as protective glass for the screen of said device.

The thickness of the glass sheet is preferably at most 1.5 mm, or even 1.1 mm. The thickness of the glass sheet is preferably at least 0.05 mm, in particular 0.25 mm and even 0.5 mm. At least one of its lateral dimensions, where appropriate before or after depositing touch-sensitive detection means, but before integration in the electronic device, is advantageously at least 1 m, or even 2 m. When it is used as protective glass for an electronic device, the maximum dimension of the glass sheet is on the other hand, and preferably, at most 1 m, in particular 50 cm and even 30 cm.

The glass of lithium aluminosilicate type is preferably such that its chemical composition comprises the following oxides in the ranges of weight contents defined below:

| | |
|---|---|
| $SiO_2$ | 50-80% |
| $Al_2O_3$ | 12-30% |
| $Li_2O$ | 1-10%. |

The total weight content of alkali metal oxides other than lithium oxide (especially $Na_2O$ and/or $K_2O$) is advantageously at most 2% by weight, in particular 1% by weight, and even 0.5% or else 0.1%. The weight content of CaO is preferably at most 1%, in particular 0.5%, and even 0.1%, or else zero (apart from inevitable impurities considering the raw materials used and/or refractories).

One preferred glass is such that its chemical composition comprises the following oxides in the ranges of weight contents defined below:

| | |
|---|---|
| $SiO_2$ | 52-75%, in particular 65-70% |
| $Al_2O_3$ | 15-27%, in particular 18-19.8% |
| $Li_2O$ | 2-10%, in particular 2.5-3.8% |
| $Na_2O$ | 0-1%, in particular 0-0.5% |
| $K_2O$ | 0-5%, in particular 0-1% |
| CaO | 0-0.5%, in particular 0-0.1% |
| ZnO | 0-5%, in particular 1.2-2.8% |
| MgO | 0-5%, in particular 0.55-1.5% |
| BaO | 0-5%, in particular 0-1.4% |
| SrO | 0-3%, in particular 0-1.4% |
| $TiO_2$ | 0-6%, in particular 0-2% |
| $ZrO_2$ | 0-3%, in particulalr 0-2.5% |
| $P_2O_5$ | 0-8%, in particular 0-1%. |

The glass sheet according to the invention is advantageously provided on one of its faces with touch-sensitive detection means. These means may in particular be of resistive, capacitive, optical or mechanical type. These means are preferably of capacitive type, and in particular projected capacitive type.

The touch-sensitive detection means, in particular, when they are of resistive or capacitive type, are preferably in the form of at least one optionally textured thin layer deposited on one face of the substrate. In particular when they are of projective capacitive type, the touch-sensitive detection means preferably comprise at least one network of conductive paths, in particular arranged as a plurality of rows and columns. The rows are generally positioned parallel to one another, as are the columns, and the rows and columns cross over at a given angle. The conductive paths preferably consist of an electrically conductive transparent oxide (TCO), typically, and non limitingly, made of indium tin oxide (ITO) or made of zinc tin oxide (IZO). The paths may in particular be obtained by deposition of layers (in particular by sputtering) followed by an etching step, for example by photolithography or by laser etching. The rows are advantageously separated from the columns by a thin electrically insulating separating layer.

Another subject of the invention is an electronic device, in particular a pocket or portable electronic device, such as in particular smartphone, personal digital assistant, digital camera, multimedia player, computer, tablet, television, automated ticket machine, automated teller machine, automated checkout machine, screen integrated into furniture, electrical goods or vehicle instrument panels, comprising as protective glass at least one glass sheet according to the invention.

The expression "protective glass" is understood to mean the glass intended to protect the display screen against impact. In the device, the protective glass is therefore in direct contact with the atmosphere and with the user. Where appropriate, when the glass sheet is provided on one of its faces with touch-sensitive detection means, as defined above, the latter are positioned on the lower face of the glass sheet, that is to say on the face of the glass sheet opposite that which is in contact with the atmosphere and which is touched by the user's finger or a stylus. In this way, the user cannot touch and degrade said means.

The display screen is preferably selected from liquid crystal display (LCD) screens and organic light-emitting diode (OLED) screens, in particular having an active matrix.

The glass sheet may be formed by various processes that are furthermore known, such as the float process, in which the molten glass is poured onto a bath of molten tin, rolling between two rolls, the "fusion-draw" process, in which the molten glass overflows a channel and forms a sheet by gravity, or else the "down-draw" process in which the molten glass flows downwards through a slit, before being drawn to the desired thickness and simultaneously cooled. A step of mechanical thinning (for example by polishing or resurfacing) may also be carried out subsequent to the forming.

The glass sheet is then, where appropriate, provided with touch-sensitive detection means. In order to do this, it is possible to coat one face, of the glass sheet according to the invention with at least one thin, optionally textured layer and in particular with two ITO layers separated by a thin electrically insulating separating layer by sputtering, the ITO layers each being etched after their deposition by photolithography or laser etching in order to form the aforementioned network of rows and columns. The invention makes it possible to carry out these steps on large-size substrates (at least one of the dimensions of which is at least 1 m, or even 2 m), rather than on substrates cut to the final size.

The glass sheet may then be cut in order to give its final dimensions, the cutting step being, if necessary, followed by a step of drilling holes, of shaping or polishing the edges and/or the surface.

Another subject of the invention is therefore a process for manufacturing a protective glass for an electronic device according to the invention comprising a step of forming the glass sheet, then a step wherein said glass sheet, at least one of the dimensions of which is at least 1 m, is provided with touch-sensitive detection means, and then a cutting step.

The following non-limiting examples illustrate the present invention.

The glass used for the example according to the invention is a lithium aluminosilicate having the following composition by weight:

| | |
|---|---|
| $SiO_2$ | 68.2% |
| $Al_2O_3$ | 19.0% |
| $Li_2O$ | 3.5% |
| MgO | 1.2% |
| ZnO | 1.6% |
| $TiO_2$ | 2.6% |
| $ZrO_2$ | 1.7% |
| $Na_2O + K_2O$ | <0.5% |

Glass sheets of this composition were produced with a thickness of 4 mm, then polished in order to reach a thickness of around 1 mm.

The glasses used for the comparative examples C1 to C4 have different chemical compositions by weight, reported in table 1 below. These glasses (having a thickness of 1 mm) are, depending on the case, soda-lime-silica glasses (example C1), sodium aluminosilicate glasses (examples C2 and C3) and borosilicates (example C4).

TABLE 1

|  | C1 | C2 | C3 | C4 |
|---|---|---|---|---|
| $SiO_2$ | 71.1 | 60.7 | 66.5 | 80.5 |
| $Al_2O_3$ | 0.7 | 7.7 | 10.5 | 2.5 |
| $B_2O_3$ | 0 | 0 | 0.5 | 13.0 |
| $Li_2O$ | 0 | 0 | 0 | 0 |
| $Na_2O$ | 13.8 | 13.1 | 14.0 | 3.4 |
| $K_2O$ | 0.3 | 9.6 | 2.0 | 0.6 |
| CaO | 8.8 | 0 | 0.5 | 0 |
| MgO | 4.0 | 8.4 | 5.5 | 0 |
| SrO | 0 | 0 | 0 | 0 |
| $SnO_2$ | 0 | 0 | 0.5 | 0 |
| $As_2O_5$ | 0 | 0 | 0 | 0 |

In order to evaluate repeated impact strengths of the glass sheets, the ring-on-tripod flexural stress at break is measured after indentation under ambient temperature and humidity conditions, in the following manner.

Test specimens of 70×70 mm² are cut from a glass sheet which has not undergone any treatment after its manufacture.

Any one face of each test specimen is then coated with an adhesive film on a face that will subsequently be placed under compression. The role of this film is to enable the origin of fracture to be located.

The indentation is carried out on the face opposite the adhesive film using a diamond Vickers tip. The test specimen is positioned under the tip so that the indentation is carried out in the middle of the test specimen, to within 1 mm. The tip is then brought down onto the test specimen and the indehtation force is maintained for 20 seconds.

In certain tests, the glass is then stored for 24 h in order to stabilize the propagation of the cracks, whereas in other tests, the flexural test is carried out just after the indentation. In the event of breakage after indentation but before the flexural test, the flexural stress at break is declared to be zero.

The ring-on-tripod flexural test is carried out using an Instron 4400R machine, controlled with a crosshead descent rate of 2 mm/min, equipped with a 5 kN load cell, a ring having a diameter of 10 mm with a torus having a radius of 1 mm, attached at the end of the Instron machine, and a stand to which 3 balls having a radius of 5 mm are bonded, positioned at 120° around a circle having a radius of 20 mm and the center of which coincides with the center of the ring.

The test specimen is placed between these 3 balls and the ring, so that the indentation mark is aligned with the center of the ring, to within 1 mm. An increasing force is then applied to the ring until the fracture of the test specimen. Only test specimens for which the origin of fracture is under the ring are counted. The stress at break as a function of the force at break and of the thickness of the test specimen is given by the following formula:

$$\sigma_{(MPa)} = \frac{0.847 \times Force_{(N)}}{thickness'_{(mm)^2}}$$

Table 2 below summarizes the results obtained by indicating for each sample the stress at break for indentation loads of 50, 100, 150 and 200 N, when the flexural test is carried out just after indentation and 24 hours after indentation. The results are an average over 5 samples. An asterix indicates that at least one of the samples broke before the flexural test.

TABLE 2

|  | Load (N) | Stress at break after 24 h (MPa) | Stress at break (MPa) |
|---|---|---|---|
| 1 | 50 | 52 | 41 |
|  | 100 | 50 | 48 |
|  | 150 | 45 | 41 |
|  | 200 | 42 | 30 |
| C1 | 50 | 38 | 38 |
|  | 100 | 33 | 33 |
|  | 150 | 32 | 28 |
|  | 200 | 26* | 15* |
| C2 | 50 | 36 | — |
|  | 100 | 33 | — |
|  | 150 | 30 | — |
|  | 200 | 8* | — |
| C3 | 50 | 36 | 32 |
|  | 100 | 42 | 26 |
|  | 150 | 22* | 15* |
|  | 200 | 20* | 4* |
| C4 | 50 | 42 | 38 |
|  | 100 | — | 34 |
|  | 150 | 31 | 31 |
|  | 200 | 14 | 14 |

These results demonstrate the superiority of the non-reinforced lithium aluminosilicate glass over the other glasses. Even in the absence of reinforcement, this glass is able to withstand substantial damage, and therefore to fulfill the role of protective glass for various electronic devices.

The invention claimed is:

1. An electronic device, comprising a protective glass consisting of at least one non-reinforced glass sheet of lithium aluminosilicate type, the chemical composition of which comprises the following oxides in the ranges of weight contents defined below:

| $SiO_2$ | 50-80% |
|---|---|
| $Al_2O_3$ | 12-30% |
| $Li_2O$ | 1-10%. | and the thickness of which is at most 2.0 mm.

2. The electronic device as claimed in claim 1, wherein the thickness of is at most 1.5 mm.

3. The electronic device as claimed in claim 2, wherein the thickness is at most 1.1 mm.

4. The electronic device as claimed in claim 1, wherein a total weight content of alkali metal oxides other than lithium oxide is at most 2% by weight.

5. The electronic device as claimed in claim 4, wherein the total weight content of alkali metal oxides other than lithium oxide is at most 1% by weight.

6. The electronic device as claimed in claim 1, wherein the chemical composition comprises the following oxides in the ranges of weight contents defined below:

| $SiO_2$ | 52-75%, |
|---|---|
| $Al_2O_3$ | 15-27%, |
| $Li_2O$ | 2-10%, |
| $Na_2O$ | 0-1%, |
| $K_2O$ | 0-5%, |
| CaO | 0-0.5%, |
| ZnO | 0-5%, |
| MgO | 0-5%, |
| BaO | 0-5%, |
| SrO | 0-3%, |
| $TiO_2$ | 0-6%, |
| $ZrO_2$ | 0-3%, |
| $P_2O_5$ | 0-8%. |

7. The electronic device as claimed in claim 6, wherein the chemical composition comprises the following oxides in the ranges of weight contents defined below:

| | |
|---|---|
| $SiO_2$ | 65-70%, |
| $Al_2O_3$ | 18-19.8%, |
| $Li_2O$ | 2.5-3.8%, |
| $Na_2O$ | 0-0.5%, |
| $K_2O$ | 0-1%, |
| CaO | 0-0.1%, |
| ZnO | 1.2-2.8%, |
| MgO | 0.55-1.5%, |
| BaO | 0-1.4%, |
| SrO | 0-1.4%, |
| $TiO_2$ | 0-2%, |
| $ZrO_2$ | 0-2.5%, |
| $P_2O_5$ | 0-1%. |

8. The electronic device as claimed in claim 1, wherein the glass sheet is provided on one of its faces with a touch-sensitive detection device, positioned on a lower face of said glass sheet.

9. The electronic device as claimed in claim 8, wherein the touch-sensitive detection device is a projected capacitive device.

10. The electronic device as claimed in claim 9, wherein the touch-sensitive detection device comprises at least one network of conductive paths arranged as a plurality of rows and columns.

11. The electronic device as claimed in claim 10, wherein the conductive paths consist of an electrically conductive transparent oxide.

12. The electronic device as claimed in claim 11, wherein the electrically conductive transparent oxide is indium tin oxide.

13. The electronic device as claimed in claim 1, wherein the electronic device is a pocket or portable electronic device, a smartphone, a personal digital assistant, a digital camera, a multimedia player, a computer, a tablet, a television, an automated ticket machine, an automated teller machine, an automated checkout machine, a screen integrated into a furniture, an electrical good or a vehicle instrument panel.

14. The electronic device as claimed in claim 1, wherein the protective glass consists of a single non-reinforced glass sheet.

15. The electronic device as claimed in claim 14, wherein the single non-reinforced glass sheet includes a first main face and a second main face that is opposite the first main face, and wherein the first main face is in contact with the outside environment and the second main face is provided with a touch-sensitive detection device.

16. An electronic device comprising a protective glass, the protective glass consisting of at least one non-reinforced glass sheet, comprising $SiO_2$, $Al_2O_3$ and $Li_2O$ and having a thickness of at most 2.0 mm, wherein surface stresses formed on the glass sheet are lower than 50 MPa, wherein the chemical composition of the at least one non-reinforced glass sheet comprises the following oxides in the ranges of weight contents defined below:

| | |
|---|---|
| $SiO_2$ | 50-80% |
| $Al_2O_3$ | 12-30% |
| $Li_2O$ | 1-10%. |

17. An electronic device, comprising as protective glass at least one non-reinforced glass sheet of lithium aluminosilicate type, the chemical composition of which comprises the following oxides in the ranges of weight contents defined below:

| | |
|---|---|
| $SiO_2$ | 50-80% |
| $Al_2O_3$ | 12-30% |
| $Li_2O$ | 1-10%, | and the thickness of which is at most 2.0 mm, said protective glass being devoid of any reinforced glass sheets.

18. The electronic device as claimed in claim 17, wherein the protective glass consists of a single non-reinforced glass sheet.

19. An electronic device comprising a screen made of a protective glass, said protective glass consisting of at least one non-reinforced glass sheet of lithium aluminosilicate type, the chemical composition of which comprises the following oxides in the ranges of weight contents defined below:

| | |
|---|---|
| $SiO_2$ | 50-80% |
| $Al_2O_3$ | 12-30% |
| $Li_2O$ | 1-10%, | and the thickness of which is at most 2.0 mm.

20. The electronic device as claimed in claim 19, wherein the protective glass consists of a single non-reinforced glass sheet.

* * * * *